UNITED STATES PATENT OFFICE.

WILLIAM D. RICHARDSON, OF CHICAGO, ILLINOIS.

PROCESS FOR OBTAINING WATER-SOLUBLE POTASH.

1,295,601.     Specification of Letters Patent.     Patented Feb. 25, 1919.

No Drawing.     Application filed August 28, 1915. Serial No. 47,728.

*To all whom it may concern:*

Be it known that I, WILLIAM D. RICHARDSON, a citizen of the United States of America, and a resident of Chicago, county of Cook, and State of Illinois, have invented certain new and useful Improvements in Processes for Obtaining Water-Soluble Potash, of which the following is a specification.

As is well known, it is exceedingly desirable to obtain water soluble potash from the insoluble silicate rocks containing potash which are distributed in great abundance throughout the world, whereas supplies of water soluble potash are rare and highly localized. My process has for its purpose the conversion of the insoluble potash as it exists in silicate rocks, such as feldspar, mica, leucite, etc., into a water soluble form which is available to plants and which can also be extracted, concentrated, and used in the various arts. In order to bring about this result I make use of hydrofluoric acid produced by mixing together a fluorid, such as fluorspar or calcium fluorid, cryolite, or any natural or artificial fluorid, and an acid capable of decomposing the fluorid such as sulfuric acid, in the presence of an intimate mixture of the insoluble silicate rock containing potash. I first grind the silicate rock, such as feldspar, and also grind to a fine powder the fluorid which is to be used in the process. The two are then mixed together in a mixer adapted to the purpose, for example, what is commonly used for the manufacture of acid phosphate, and a suitable quantity of sulfuric acid is added. After agitating the mixture for a short space of time it is dropped or conveyed to a closed space or den to allow the action to complete itself. After a suitable length of time the den is opened and the product removed. For convenience in operating my process I arrange two hoppers, one containing the ground silicate rock containing potash, and the other the ground fluorid above and near the mixing apparatus. A tank of sulfuric acid is also located above and near the mixing apparatus. I then operate by allowing the three materials to enter the mixer at practically the same time, or I may allow the two rocks to enter first and after they are well mixed run in the acid. By either method of procedure I finally obtain a workable mass of fertilizer containing water soluble potash which is suitable for mixing with commercial fertilizers in the ordinary way. As an illustration of my process the following example is cited:

One thousand pounds of finely ground feldspar and five hundred pounds of finely ground fluorspar are dropped into the mixing apparatus and well agitated. After mixing thoroughly five hundred pounds of fifty-one degree Baumé sulfuric acid are added and the whole agitated until thorough admixture is secured. The mixture is then dropped into a den for further action. The strength of acid and also the proportions may be varied within considerable limits without changing the essential nature of the process. When using considerable amounts of sulfuric acid the mixture in the den is sometimes too wet when removed, and in this case I remove the excess moisture and further complete the action by drying the mixture in any suitable form of mechanical drier. I also with certain mixtures make use of a mechanical drier to complete reaction and dry the product after it leaves the mixer.

Having now described my process I claim and desire to secure by Letters Patent:

1. The process of rendering water soluble the potash in insoluble silicate rocks which consists in mixing together in the presence of water a silicate rock containing potash, a fluorid bearing mineral and an acid capable of decomposing the fluorid without the application of heat.

2. The process of rendering water soluble the potash in insoluble silicate rocks which consists in mixing together in the presence of water a silicate rock containing potash, a fluorid bearing mineral and an acid capable of decomposing the fluorid and permitting continued interaction of said ingredients without the application of extraneous heat.

3. The process of rendering the potash in insoluble silcate rocks soluble which consists in mixing together feldspar, a fluorid bearing mineral, and an aqueous solution of an acid capable of decomposing the fluorid without the application of extraneous heat.

Signed at Chicago this 25th day of August, 1915.

WILLIAM D. RICHARDSON.